United States Patent [19]

Insam

[11] 4,161,728
[45] Jul. 17, 1979

[54] ELECTRONIC DISPLAY APPARATUS

[75] Inventor: Edward F. Insam, Harrow, England

[73] Assignee: The General Electric Company Limited, London, England

[21] Appl. No.: 829,710

[22] Filed: Sep. 1, 1977

[30] Foreign Application Priority Data

Sep. 6, 1976 [GB] United Kingdom ............... 36842/76

[51] Int. Cl.$^2$ ............................................. G06K 15/20
[52] U.S. Cl. ................................. 340/750; 179/2 TV; 340/701; 340/799; 358/85; 358/263; 358/903; 364/900
[58] Field of Search ....... 340/324 AD, 337 A, 152 R; 358/85, 263, 903; 364/514; 179/2 TV

[56] References Cited

U.S. PATENT DOCUMENTS

| 3,654,620 | 4/1972 | Bartocci | 340/324 AD |
| 3,870,825 | 3/1975 | Roberts et al. | 340/152 R |
| 3,872,460 | 3/1975 | Fredrickson et al. | 340/324 AD |
| 4,026,555 | 5/1977 | Kirschner et al. | 340/337 X |
| 4,070,662 | 1/1978 | Narveson | 340/324 AD |

Primary Examiner—David L. Trafton
Attorney, Agent, or Firm—Kirschstein, Kirschstein, Ottinger & Cobrin

[57] ABSTRACT

In a television receiver there are provided means for decoding and displaying data received in coded form either on a television carrier signal during field blanking periods or over a telephone line, the decoding means and the display means being interconnected by way of multiconductor data and address highways or buses. Data storage and data processing means, and also other data input means may be connected to these highways.

5 Claims, 4 Drawing Figures

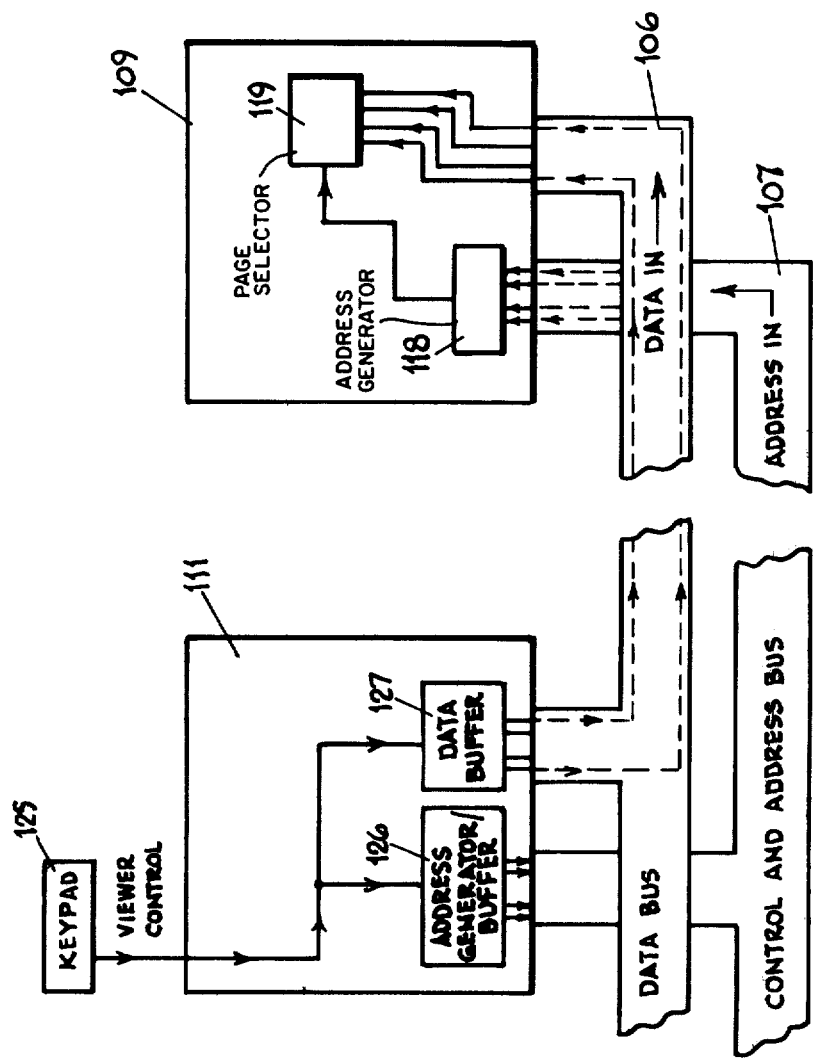

ELECTRONIC DISPLAY APPARATUS

The present invention relates to electronic display apparatus and more particularly to apparatus for the control of information displayed on a television type of display system.

A television type of display system is one in which information is displayed by illumination of one or more areas of a screen by electronic selection.

The information may be received by a television transmission system known generically as a teletext. Such a system is described for example in United Kingdom patent specification No. 1467240. It may alternatively be received over a telephone line by a modem and one example of such an information transmission system is the VIEWDATA system proposed by the British Post Office. Information for display may also be generated by more localised apparatus such as a teleprinter and may be displayed prior to transmission.

A problem which arises in the design of such apparatus is that for a particular application it has heretofore normally been necessary either to design the apparatus to perform one specific function or to include redundant circuitry within such apparatus and provide means for switching in such redundant circuitry when a variation in operation is required. In particular it is envisaged that apparatus will be required for the display of both teletext and VIEWDATA information.

According to the present invention there is provided apparatus for the control of information displayed on a television type of display system in which units for the control of the display of information are connected to one or more common busses, the operation of one or more of the units being controlled by signals imposed on the busses by further units.

More particularly the units include a memory unit for the storage of the information to be displayed, a display unit for the provision of signals to the television type of display, a decoder unit for decoding received coded information and a control unit for the control of the operational mode of the apparatus.

In a particular embodiment for the display of teletext signals the decoder unit is a teletext decoder including means for receiving information signals modulated on a broadcast television carrier during field blanking intervals and for converting these signals into binary coded data characterising the information to be displayed, the binary coded data being stored in the memory unit prior to display on the television type of display.

In a preferred embodiment connection means are provided along the busses for the releasable connection of two or more decoder units the apparatus being capable of functioning with either one or all of the decoder units in position. The connection means may be female connectors permanently connected to the one or more busses.

According to another aspect of the present invention in apparatus for the control of information to be displayed on a television type of display, in which said information is arranged to be stored prior to display and in which there is provision for more than one source of said information or more than one destination, electric signals relating to said information are arranged to be transferred within said apparatus over an information signal highway or bus in dependence upon storage or display address signals on an address signal highway or bus.

According to another aspect of the present invention in a television receiver including means for decoding and displaying data received in coded form there is provided a microprocessor and data and address highways interconnecting said microprocessor and said decoding and display means.

According to yet another aspect of the present invention apparatus for the display of information comprises a television-type display, character generator means for generating video signal elements for said display in response to data signals representing characters and symbols to be displayed, at least one receiver means for receiving and decoding coded signals, including coded data signals, data storage means, a multiconductor bus arrangement over which data signals are transferred in parallel mode between said receiver means, said storage means and said character generator means, and a multiconductor address bus arrangement to which address signals are applied in parallel mode to control the transfer of said data signals on said data bus to the required destination.

Electronic display apparatus in accordance with the present invention will now be described by way of example with reference to the accompanying drawings in which:

FIG. 4 shows a part of the apparatus of FIG. 1 illustrating the entry of a desired teletext page number in the page selector store of the teletext decoder.

Figure 1:
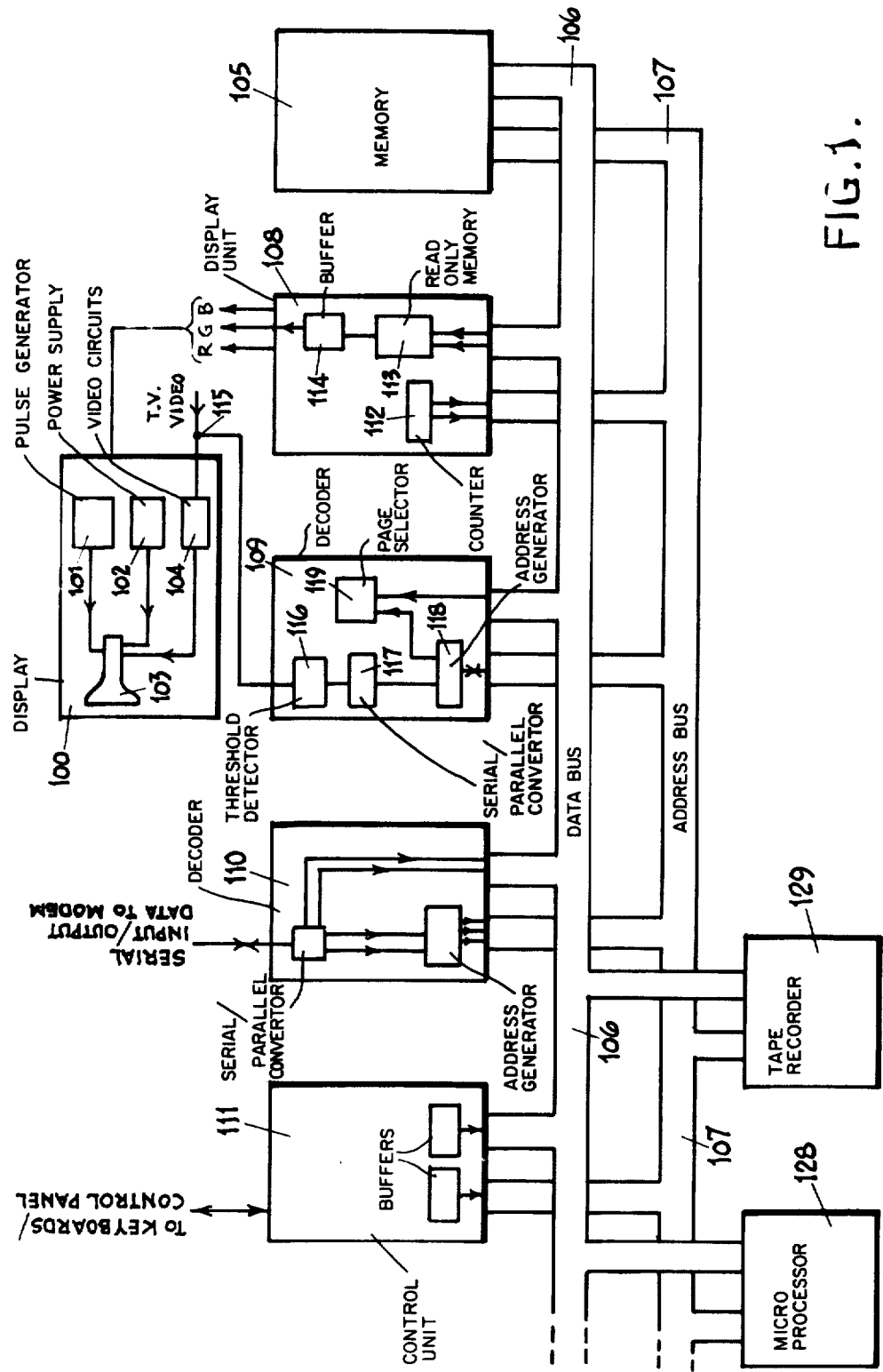
FIG. 1 shows electronic display apparatus for the display of either teletext or VIEWDATA information.

Referring now to FIG. 1 there is shown control and display apparatus for the display of either teletext or VIEWDATA information. The display apparatus is shown as a block 100 and includes pulse generation means 101 and power supply means 102 for the display of information on a television screen 103. For the display of normal television picture information normal television video circuitry 104 is included together with appropriate viewer controls (not shown).

A memory unit 105 for the storage of information to be displayed is connected to a common data highway or bus 106 and a common control/address highway or bus 107. A display unit 108, a teletext decoder 109, a VIEWDATA decoder 110, a control unit 111, a microprocessor 128 and a tape recorder 129 are also connected to the busses 106, 107. The teletext decoder 109 or the VIEWDATA decoder 110 may be omitted if the apparatus required only one such facility.

The modes of operation of the various units of the apparatus of FIG. 1 will now be described. The common data bus 106 is used to transfer data in a binary coded form to and from the various units 105, 108, 109, 110 and 111. For example information stored in the memory unit 105, which information normally represents a page of information to be displayed, is accessed by the display unit 108 and is converted to Red, Green and Blue (R, G and B) drives for the cathode ray tube display 103. Information can be written into the memory unit 105 by any of the other units connected to the common bus system. All units that write information into the memory unit 105 are in this respect independent of each other.

Information is written into the memory unit 105 by a writing unit (not shown) on either the VIEWDATA decoder 110 or the teletext decoder 109 entering a signal on to the control bus which signal instructs the display unit 108 to remove its addressing drive lines to the memory unit 105 so that the writing unit can enter its address and data. After writing the new data into the memory the control bus is released back to the display board. The information is written during the scan retrace periods so as not to interfere with the display.

The common data bus 106 comprises eight data path lines or conductors, and data is transferred over this bus in parallel mode, that is, with binary coded signals of different weights occurring substantially simultaneously on respective lines.

The common address bus 107 comprises sufficient lines or conductors to provide column end row addresses to the memory unit 105, these addresses being generated by either the display unit 108 when displaying data on the screen 103 or by one of the writing/reading units to enter data or read data into or out of the memory 105. For example sixteen address lines may be provided, together with say three lines for control functions.

Figure 2:
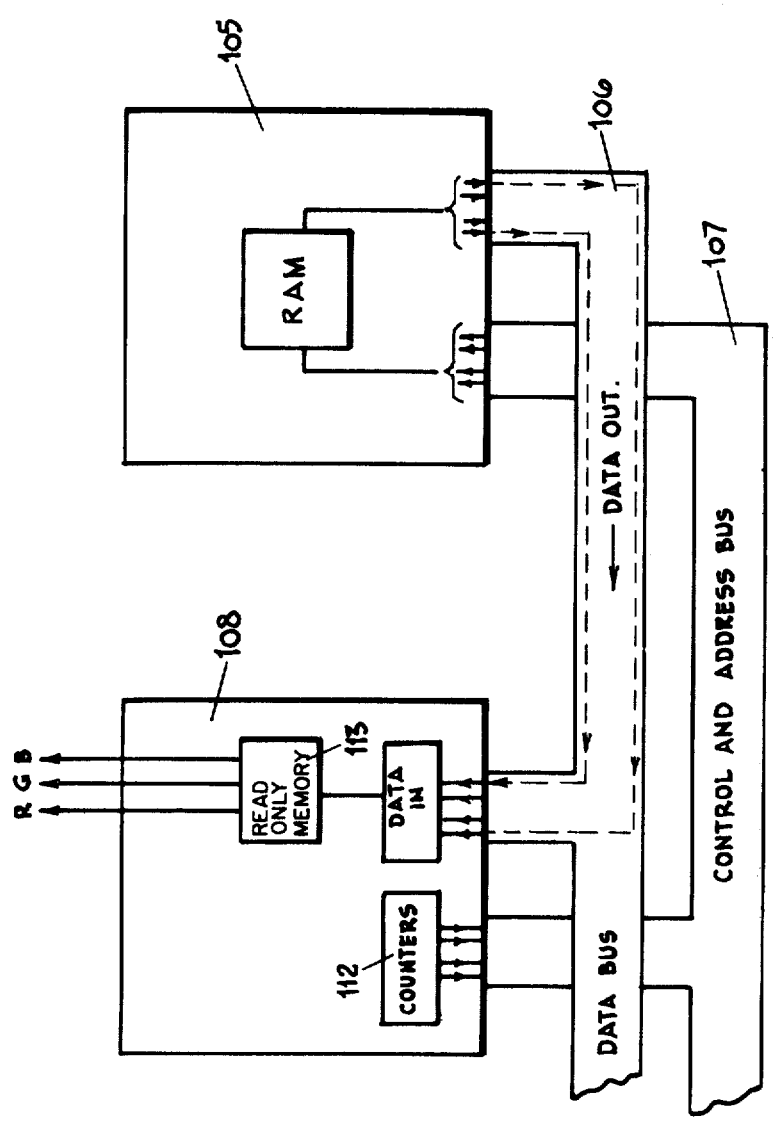
FIG. 2 shows a part of the apparatus of FIG. 1 illustrating the flow of signals in the display mode.

The display unit 108 includes a counter 112 which is synchronised to the T.V. scan rates, which produces an address on the address bus 107 corresponding to a location of the memory 105 containing the information to be displayed at a particular position on the screen. The output data from the memory unit 105 present on the data lines is converted to display format by a character generator read only memory 113 the output of which is fed via a C.R.T. buffer drive circuit 114 to the display 100. The signal flow in the mode is illustrated in FIG. 2.

The teletext decoder 109 includes an input terminal 115 for the composite video/data signal from the television aerial. A threshold detector circuit 116 is connected to the aerial input and detected signals are converted from serial to parallel form in a converter 117. An address generator 118 generates the appropriate addresses for the memory unit 105 and incoming data is stored in these addresses via data bus 106. A page selector 119 selects the required page of information from the large number of transmitted pages, the page selector being set from the control unit 111 via the common address bus 107.

Figure 3:
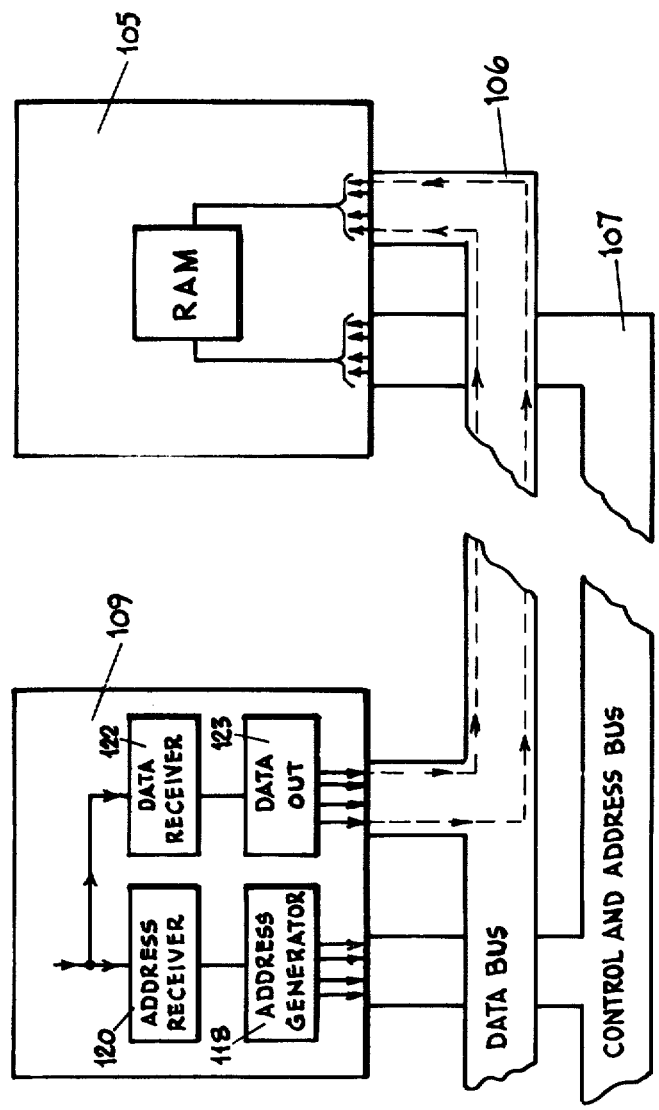
FIG. 3 shows a part of the apparatus of FIG. 1 illustrating the writing of teletext information into the memory.

FIG. 3 shows by means of the thick arrowed lines the paths taken by the addresses and the data from the teletext unit 109 to the memory unit 105. The address generator 118 receives an address via an address receiving circuit and transmits the address via bus 107 to the memory unit 105. Similarly data is received by a data receiving circuit 112 in the teletext unit 109 and is fed to a data buffer and transmitter circuit 123 for transmission via bus 106 to the memory unit 105. A read/write pulse line (not shown) enters the data into the random access memory in the unit 105.

FIG. 4 shows by means of the thick arrowed lines the method of entering a selected page number into the page selector store 119 in the teletext unit 109. The page number on the data bus 106 is entered into the control unit from a keypad 125 (or similar device). The address of the page selector store 119 is generated within the control unit 111 for example in response to operation of a special key on the keypad, and this address and the page number are stored in respective output buffers 126, 127 prior to transmission to the teletext decoder. The page number may for example be transmitted in binary coded decimal.

The control unit 111, which may or may not use a microprocessor, acts as an interface between the busses 106 and 107 and external devices such as the keypad 125, or a keyboard (not shown), and also sensors and appliances so that the intelligence in the microprocessor plus the use of the visual display can be used to control these devices.

Because of the bus structure the microprocessor 128 shown in FIG. 1 may be linked with the memory unit 105 so as to put into effect program instructions stored in that memory unit. These instructions may either by received by way of, say, the decoder 110 and stored until required by the tape recorder 129, or may be entered from a pre-recorded tape. The recorder 129 may for example by an audio frequency cassette recorder, capable of handling data in serial mode at, say, one thousand two hundred bauds. The microprocessor 128 may thereby be arranged to carry out numerical calculations on or to respond in a predetermined way to input data, the results being displayed on the cathode ray tube 103 by way of the display unit 108. The microprocessor 128 may be associated with a programmable read-only memory (not shown) containing basic program instructions.

In a preferred form of the display apparatus described above and illustrated in the enclosed drawings, the display apparatus 100 is provided by a conventional domestic television broadcast receiver (either monochrome or colour) which is adapted to enable teletext or VIEWDATA information to be displayed on the screen of the receiver. The additional equipment to provide these facilities, namely the units 105, 108, 109, 110 and 111, the microprocessor 128 (all conveniently in integrated circuit form) possibly the cassette recorder 129, and the busses 106 and 107 are contained within the cabinet of the television receiver in addition to the usual radio frequency, intermediate frequency and video stages and scanning generators of the television receiver. With this arrangement, the only extra piece of equipment required for the television receiver to be used selectively for either normal television viewing or teletext or VIEWDATA display is the keypad 125 (or a larger keyboard) which may be coupled to the receiver via an ultrasonic link in the manner hitherto used for the remote control of television receivers.

I claim:

1. Apparatus for the display of information comprising a television-type display, character generator means for generating video signal elements for said display in response to data signals representing characters and symbols to be displayed, at least one receiver means for receiving and decoding coded signals including coded data signals, data storage means, a multiconductor bus arrangement over which data signals are transferred in parallel mode between said receiver means, said storage means and said character generator means, and a multiconductor address bus arrangement to which address signals are applied in parallel mode to control the transfer of said data signals on said data but to the required destination.

2. Apparatus in accordance with claim 1 including a microprocessor and means to connect said microprocessor to said multiconductor data bus and said multiconductor address bus.

3. Apparatus in accordance with claim 1 wherein connection means are provided along each bus for the releasable connection of at least said receiver means and said data storage means.

4. Apparatus in accordance with claim 3 wherein the connection means are socket connectors permanently connected to each said bus.

5. Apparatus in accordance with claim 1 wherein there are provided at least two data storage means each releasably connected to said data bus and to said address bus.

* * * * *